R. C. DOLE & C. A. HINEMEYER.
SPEED INDICATOR.
APPLICATION FILED AUG. 16, 1911.
1,031,537.
Patented July 2, 1912.
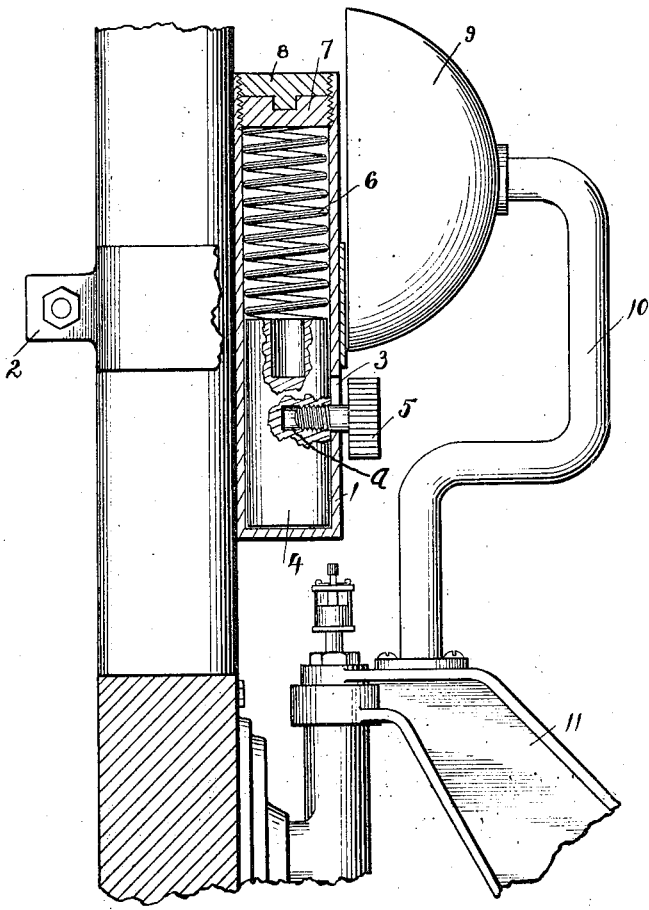
Witnesses
Darrell Bailey
U. B. Hillyard
Inventors
Raymond C. Dole.
Charles A. Hinemeyer.
By Victor J. Evans
Attorney

UNITED STATES PATENT OFFICE.

RAYMOND C. DOLE AND CHARLES A. HINEMEYER, OF TOLEDO, OHIO.

SPEED-INDICATOR.

1,031,537.          Specification of Letters Patent.      Patented July 2, 1912.

Application filed August 16, 1911. Serial No. 644,304.

*To all whom it may concern:*

Be it known that we, RAYMOND C. DOLE and CHARLES A. HINEMEYER, citizens of the United States, residing at Toledo, in the county of Lucas and State of Ohio, have invented new and useful Improvements in Speed-Indicators, of which the following is a specification.

The present invention provides means for automatically giving warning when a vehicle has attained a predetermined speed when in operation so that due caution may be exercised to prevent excessive speed.

The invention contemplates a speed indicating appliance adapted most especially for automobiles and like mechanically propelled vehicles to be attached to a wheel thereof for giving an audible signal when the vehicle in motion attains a predetermined speed.

The invention consists of the novel features, details of construction and combination of parts, which hereinafter will be more particularly set forth, illustrated in the accompanying drawing, and pointed out in the appended claim.

Referring to the drawing, forming a part of the specification,

Corresponding and like parts are referred to in the following description, and indicated in all the views of the drawing, by the same reference characters.

The mechanism embodies a casing 1 which is adapted to be secured to a wheel of the vehicle in any manner and as shown said casing is provided with a clamp 2 to be fitted to a spoke of the wheel. The casing 1 has a longitudinal slot 3 in a side thereof near one end and its opposite end is open and internally threaded for a short distance. A weight 4 is loosely mounted within an end portion of the casing 1, designated hereinafter as the inner end, in counterdistinction to the end which faces outward and is provided with the inner screwthreads. A tappet 5 has connection with the weight 4 to move therewith and consists of a machine screw, the head constituting the tappet and the body of the screw passing through the slot 3 and entering a threaded opening *a* formed in a side of the weight 4. The length of the slot 3 practically determines the movement of the weight 4. A helical spring 6 is located in the outer portion of the casing 1 and exerts an inward pressure upon the weight 4. The effective tension of the spring 6 is adapted to be regulated by means of a plug 7, which is threaded into the outer end of the casing 1, said plug being adapted to be adjusted by means of a screw-driver or like implement or tool. A seal 8 closes the outer end of the casing 1 to prevent tampering with the plug 7 after the same has been set to properly adjust the tension of the spring 6.

A gong bell 9 is suitably supported to be sounded by the tappet 5 when the vehicle has attained the predetermined speed. The gong bell 9 may be connected with any convenient part of the vehicle and as shown an arm 10 supports the bell and in turn is connected to a part of the axle 11. The bell 9 is adjusted with reference to the tappet 5 so that when the vehicle is moving at a speed less than the predetermined speed the tappet 5 will remain spaced from the bell so as not to sound an alarm, but when the speed of the vehicle attains the predetermined degree the tappet 5 is caused to come in contact with the bell 9 and sound an alarm.

When arranging the parts the casing 1, which is oblong, is placed in line with a radius of the wheel and is secured by means of the clamp 2 to a spoke thereof, the end containing the weight 4 facing inward so that when the vehicle is in motion the weight 4 tends to move downward by centrifugal action. When the speed of the vehicle attains that for which the indicator is set the weight 4 is thrown outward, thereby bringing the tappet 5 in contact with the bell and at the same time compressing the spring 6 and when the speed of the vehicle is reduced so as to fall below the predetermined point the spring 6 reacting moves the weight 4 inward and carries the tappet 5 away from the bell. It will thus be understood that the invention provides simple and effective means for apprising the driver or operator of a vehicle when the speed reaches a given point so that proper care may be exercised to guard against exceeding the limit.

From the foregoing description, taken in connection with the accompanying drawing, the advantages of the construction and of the method of operation will be readily apparent to those skilled in the art to which the invention appertains, and while we have described the principle of operation of the invention, together with the device which we now consider to be the embodiment thereof, we desire to have it understood that the device shown is merely illustrative, and that such changes may be made when desired as are within the scope of the claim appended hereto.

Having thus described the invention what is claimed as new, is:—

In a speed indicator, the combination of a signal device, a casing having a slot in the side and having an end portion internally threaded, a weight loose within the casing, a tappet having connection with the weight and arranged to operate in the slot of the casing, a spring located within the casing and normally tending to move the weight inward, a plug threaded into the casing and adapted to vary the effective tension of the spring, and a seal for closing the end of the casing to prevent tampering with the spring adjusting plug.

In testimony whereof we affix our signatures in presence of two witnesses.

RAYMOND C. DOLE.
CHARLES A. HINEMEYER.

Witnesses:
WM. E. COLE,
FRANK MERRELL ALCOCK.